United States Patent [19]
Wald et al.

[11] Patent Number: 5,102,429
[45] Date of Patent: Apr. 7, 1992

[54] SHELLING-RESISTANT ABRASIVE GRAIN, A METHOD OF MAKING THE SAME, AND ABRASIVE PRODUCTS

[75] Inventors: Vernon M. Wald, White Bear Lake; Robert S. Kirk, St. Paul, both of Minn.

[73] Assignee: Minnesota Mining and Manfacturing Company, St. Paul, Minn.

[21] Appl. No.: 573,322

[22] Filed: Aug. 27, 1990

Related U.S. Application Data

[63] Continuation of Ser. No. 258,196, Oct. 14, 1988, Pat. No. 5,011,508.

[51] Int. Cl.$^5$ .............................................. B24D 11/00
[52] U.S. Cl. ...................................... 51/295; 51/298; 51/307; 51/308
[58] Field of Search .................. 51/295, 298, 307, 308

[56] References Cited

U.S. PATENT DOCUMENTS

| | | | |
|---|---|---|---|
| 3,893,826 | 7/1975 | Quinan et al. | 51/295 |
| 4,314,827 | 2/1982 | Leitheiser et al. | 51/298 |
| 4,461,799 | 7/1984 | Gavrilov et al. | 51/295 |
| 4,518,397 | 5/1985 | Leitheiser et al. | 51/298 |
| 4,574,003 | 3/1986 | Gerk | 51/309 |
| 4,623,364 | 11/1986 | Cottringer et al. | 51/309 |
| 4,744,802 | 5/1988 | Schwabel | 51/309 |

FOREIGN PATENT DOCUMENTS 0294208 12/1988 Fed. Rep. of Germany.

Primary Examiner—William R. Dixon, Jr.
Assistant Examiner—Willie J. Thompson
Attorney, Agent, or Firm—Gary L. Griswold; Walter N. Kirn; Richard Francis

[57] ABSTRACT

Sinter ceramic abrasive grains having increased surface area and a method of making the same are provided. The abrasive grains are incorporated into improved "shelling-resistant" abrasive articles such as coated abrasives, grinding wheels and non-woven abrasives. The ceramic abrasive grains are made by providing first particles comprising alpha-alumina precursor, introducing fine parpticles which can be sintered directly to the surface of the first particles upon sintering of the same, and heating the mixture of particles under sintering conditions to cause autogenous bonding of the fine particles of the surface of each of the first particles.

14 Claims, 1 Drawing Sheet

SHELLING-RESISTANT ABRASIVE GRAIN, A METHOD OF MAKING THE SAME, AND ABRASIVE PRODUCTS

This is a continuation of application Ser. No. 07/258,196 filed Oct. 14, 1988, U.S. Pat. No. 5,011,508.

TECHNICAL FIELD

This invention relates to shelling-resistant ceramic abrasive grain, a method of making the same, and abrasive products which contain the same.

BACKGROUND ART

Shelling is a term sometimes employed by those familiar with the abrasive industry, particularly the coated abrasive industry, which refers to the phenomenon whereby abrasive grains are released prematurely from a bond system which is typically intended to hold the abrasive grain throughout the useful life of the abrasive grains. The term "shelling" may have been adopted because someone thought the phenomenon of the abrasive grains being released from the bond system was similar to the releasing of kernels of corn from an ear of corn during a corn shelling operation. While there are some exceptions, e.g., where the abrasive product is used as a source of abrasive grain for a slurry, shelling of abrasive grain from abrasive products is unwanted because it has the effect of reducing the efficiency of the abrasive product because of the loss of the abrading surfaces which would have been provided by the missing abrasive grain, and for other reasons explained below. The decreased efficiency by shelling can be noted in all types of abrasive products such as bonded abrasive products, e.g., grinding wheels, and non-woven abrasive products, but is particularly notable in coated abrasive products where substantially all of the abrasive grains are held on a sheet by the bond system with one end of each grain typically being exposed or nearly exposed. The loss of abrasive grain by shelling from coated abrasive products can provide non-abrasive areas on the coated abrasive surface, reducing abrasive efficiency and possibly resulting in uneven surface finishing.

The shelling problem can be particularly significant when the abrasive product is used for high stock removal applications. During such use, the abrasive product must be able to withstand high pressures and rotative speeds and still provide sufficient abrasive cut. For example, a coated abrasive disc can traverse 12,000 revolutions per minute (rpm) and be subjected to an interface pressure as high as 15 kg/cm$^2$. While these severe conditions are preferred because they usually result in increased cut rates, they also severely tax the adhesive bond between the abrasive grain and the bond system. If this bond fails, abrasive grains are ejected (or shelled) from the coated abrasive product at an extremely high rate of speed which could result in serious injury to the operator, particularly when the abrasive grains are of a large grit size. This hazard is of grave concern to those in the abrasives industry and it sometimes results in products not being used to their full potential because of the possible safety hazard.

Furthermore, many abrasive products, particularly coated abrasive products, utilize moisture-susceptible resinous bond systems, the most popular comprising phenolic resin. Bond systems based upon phenolic resins are known to increase the potential for an abrasive product to shell as the moisture level of the grinding conditions is increased.

Many solutions to the shelling problem have been proposed, but they have been either impractical, expensive, of little utility, or not particularly suited for use with sintered ceramic abrasive grains.

The earliest known reference specifically directed to solving the shelling problem is U.S. Pat. No. 1,528,543 (Hartmann) which discloses a process for treating the surfaces of crystalline mineral materials to scratch and roughen the grain surfaces and thus increase their bonding qualities. Various other references disclose the adhesion of smaller particles to the surface of larger particles to increase surface area by utilization of a bonding layer or flux to obtain particles having surface bonded smaller particulate material. For example, U.S. Pat. No. 3,269,815 (Koopman) discloses coating abrasive grain with finely divided particles of solid material such as carbides and nitrides by cementing these particles to the abrasive grain by a thin ceramic film such as glass. The thin ceramic film will soften at a temperature less than the softening or melting of the abrasive grain or the solid materials to thereby cement the finely divided particles to the abrasive grain to promote resin adherence and increase the bonded strength between the particles of abrasive grain when in a bonded abrasive article. Additionally, U.S. Pat. No. 4,472,173 (Bruning et al) discloses corundum abrasive grain which is coated with ground frit, a binder and fine grain highly abrasive material for the purpose of improving adhesion of the abrasive grain in its processing to resin-bonded abrasives.

Additionally, certain references disclose forming compacts of smaller particles which would inherently have a greater surface roughness. For example, U.S. Pat. No. 4,252,544 (Takahashi) discloses alumina abrasive grain constructed of electro-fused or high temperature calcined alumina coarse crystal particles and alumina fine crystal particles which are located between the alumina coarse crystal particles. These abrasive grains are manufactured by forming alumina coarse powder of a particular type, forming alumina fine powder of a particular type, kneading the alumina coarse powder and alumina fine powder in the presence of water or, if necessary, primary binder, extruding the kneaded material by means of a mechanical extruder, drying the extruded material, cutting the extruded material to a predetermined length, and sintering the dried and cut pieces of the extruded material at a temperature higher than that of the calcining temperature of the fine powdered alumina and lower than 1700° C.

There is no indication in any of the aforementioned references that the teachings could be utilized to produce alpha-alumina based ceramic abrasive grain having desirable physical properties without altering the same and without modifying the ceramic abrasive grains by the application of binder layers or flux. The type of ceramic abrasive grain desired to be improved according to the present invention is, for example, that disclosed in assignee's U.S. Pat. No. 4,744,802 (Schwabel). Other references which disclose the preparation of alumina-based ceramic abrasive grain of this type include U.S. Pat. Nos. 4,314,827 (Leitheiser et al), 4,518,397 (Leitheiser et al) and 4,574,003 (Gerk).

None of the above mentioned references discloses ceramic particulate material having small separated masses of inorganic material autogenously bonded to the surface thereof to provide an improved abrasive grain which is shelling resistant, or abrasive products such as bonded abrasive products, non-woven abrasive products, and coated abrasive products, which contain the same.

SUMMARY OF THE INVENTION

According to the present invention, improved abrasive grains comprising ceramic particulate material having small separated protuberant masses of inorganic material autogenously bonded surface thereof are provided. The term "autogenously bonded" means that separated surface masses are bonded to the surface of each ceramic particle without any type of external bonding medium such as flux, vitreous bonding material, organic binder, glass, or the like. Bonding of the surface particulate materials is solely as a result of binder-free adhesion between the precursor of the material forming the abrasive grain and the precursor of the material forming the inorganic mass which ultimately forms a permanent bond therebetween on firing to sinter the precursor materials to form a ceramic material.

It has been discovered, quite unexpectedly, that inorganic surface masses may be formed as protuberances on ceramic abrasive grains during the sintering operation without deleterious effect of the abrading properties of the resultant abrasive grain. The resultant abrasive grain has an expanded surface area provided by the attached protuberant masses which thereby provides a structure which is more shelling resistant than the conventional protuberant-free surface and has unexpectedly improved performance in some cases.

More particularly, the invention provides a method of making ceramic abrasive grain each grain of which is characterized by having autogenously bonded to the surface thereof a multitude of small separated protuberant masses of inorganic material. The method comprises the steps of providing mass of first particles comprising alpha-alumina precursor material, each particle of which is sinterable to alpha-alumina-based abrasive grain, introducing into the mass second particles much finer than the first particles, the second particles being capable of autogenous bonding to the surface of the first particles upon sintering of the first particles to a hard protuberant mass of inorganic material, and heating the particles under sintering conditions to sinter the first particles and cause autogenous bonding of the second particles to the surface of each of the first particles.

The process contemplates introducing the second particles by tumbling the first particles to cause the first particles to wear away on their surfaces to generate the second particles. This is done without substantially affecting the particle size of the first particles. The tumbling is continued until attachment of the generated second particles to the surface of each of the first particles results. The method also contemplates the introduction by addition of second particles to the first particles of second particles which are of a material which is different from the composition of the material forming the first particles. The second particles are then tumbled with the first particles to cause the second particles to attach to the surface of the first particles.

The preferred method involves preparing the first particles by providing a mixture of an aqueous dispersion of alumina-hydrate, gelling the mixture, drying the gelled mixture to product a dried solid, and crushing the dried solid to produce the first particles.

The method may include the step of calcining at least the first particles to substantially remove bound volatile materials prior to introducing the second particles into the mass of first particles.

As previously stated, the abrasive grains of the invention comprise alpha-alumina based ceramic particles having autogenously bonded masses of inorganic material to provide a multiplicity of surface protuberances on each abrasive grain. The preferred abrasive grain according to the invention has surface protuberances which comprise a material selected from the group consisting of alumina, alpha alumina, alumina:zirconia, zirconia, silicon nitride, rare earth metal oxides, yttria, chromia, ceria, titanium carbide, titanium nitride, silicon alumina oxynitride, silicon alumina oxycarbide, yttrium alumina-garnet, hexagonal rare earth aluminate, aluminum oxynitride, oxides of zinc, magnesium or nickel and mixtures thereof.

The abrasive grain according to the present invention also contemplates the inclusion of at least one modifying additive in the alpha-alumina based ceramic. The modifying additive preferably is an oxide of one or more metals selected from the group consisting of magnesium, zinc, zirconium, hafnium, cobalt, nickel, yttrium, praseodymium, samarium, ytterbium, neodymium, lanthanum, gadolinium, cerium, dysprosium, and erbium.

The invention also provides abrasive products made with the abrasive grain of the invention. The abrasive products may be in the form of coated abrasive products, bonded abrasive products, e.g., grinding wheels, honing stones, and the like, which may include a vitreous or nonvitreous binder, e.g., an organic binder, or non-woven abrasive products.

The ceramic abrasive grains according to the invention have increased surface area which results in improved adhesion to the bond system in abrasive type products. By improving the adhesion, the abrasive products can be utilized at higher pressures, which results in an increase in the stock removal rates. Additionally, abrasive products containing the abrasive grain of the invention will abrade significantly more stock from a workpiece than a corresponding abrasive product made without surface modification of the abrasive grain as herein described.

BRIEF DESCRIPTION OF THE DRAWING

The invention may be further understood by reference to the Drawing wherein.

DETAILED DESCRIPTION

Figure 1:
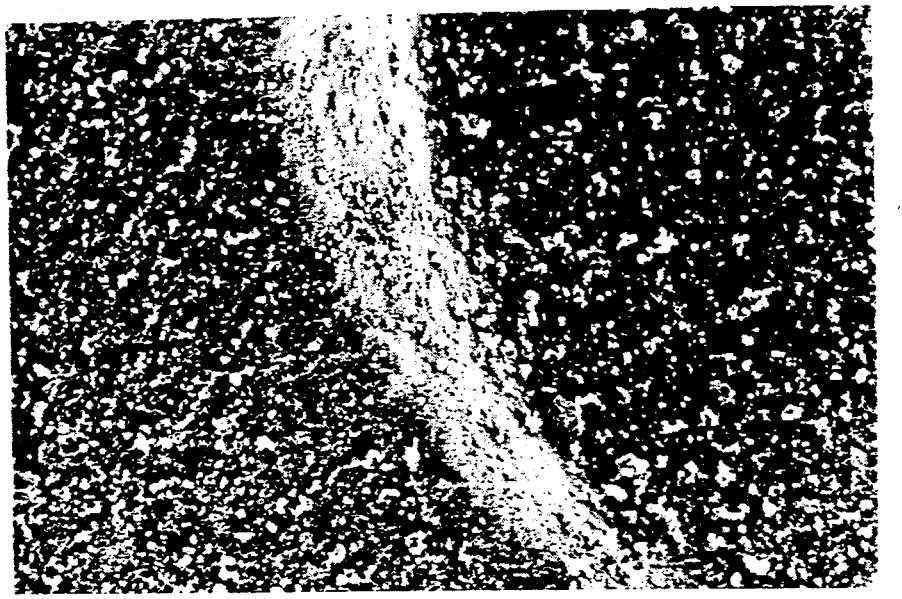
FIG. 1 is a 700x photomicrograph of the surface of an abrasive grain according to the present invention, photographed using a scanning electron microscope.

This invention pertains to alpha-alumina based ceramic abrasive grains which are prepared by drying and firing particulate precursor material below the melting temperature of the ceramic to achieve sintering of the dehydrated starting materials. During heating the precursor material will be transformed to a dehydrated metal oxide structure which will densify as heating continues. The most common alpha-alumina-based ceramic may be modified with oxides of metals such as magnesium, nickel, zinc, yttria, rare earth oxides, zirconia, hafnium, chromium or the like. The preferred method of making the ceramic abrasive grain is by the so called sol-gel process disclosed in the following U.S. Pat. Nos. 4,314,827; 4,518,397; 4,574,003; 4,623,364; and 4,744,802, each of which is incorporated herein by reference.

To prepare the sol gel alumina-based ceramic abrasive grains, a dispersion comprising from about 2 to almost 60 weight percent alpha alumina oxide monohydrate (e.g., boehmite) is first formed. The boehmite can either be prepared from various techniques well known in the art or can be acquired commercially from a number of suppliers. Examples of commercially available materials include Disperal®, produced by Condea Chemie, GMBH and Catapal®, produced by Vista Chemical Company. These aluminum oxide monohydrates are in the alpha-form, are relatively pure (including relatively little, if any, hydrate phases other than monohydrate), and have a high surface area.

The dispersion may contain a precursor of a modifying additive which can be added to enhance some desirable property of the finished product or increase the effectiveness of the sintering step. These additives are in the form of soluble salts, typically water soluble, and typically consist of a metal-containing compound and can be a precursor of the oxides of magnesium, zinc, cobalt, nickel, zirconium, hafnium, chromium, titanium, yttrium, rare earth oxides, and mixtures thereof. The exact proportions of these components that are present in the dispersion are not critical to this invention and thus can vary to convenience.

A peptizing agent is usually added to the boehmite dispersion to produce a more stable hydrosol or colloidal dispersion. Monoprotic acids or acid compounds which may be used as the peptizing agent include acetic, hydrochloric, formic and nitric acid Nitric acid is a preferred peptizing agent. Multiprotic acids are normally avoided since they rapidly gel the dispersion making it difficult to handle or mix in additional components Some commercial sources of boehmite contain an acid titer (such as absorbed formic or nitric acid) to assist in forming a stable dispersion.

The dispersion can be formed by any suitable means which may simply be the mixing of aluminum oxide monohydrate with water containing a peptizing agent or by forming an aluminum oxide monohydrate slurry to which the peptizing acid is added. Once the dispersion is formed, it preferably is then gelled. The gel can be formed by any conventional technique such as the addition of a dissolved or dispersed metal containing modifying additive, e g., magnesium nitrate, the removal of water from the dispersion of some combination of such techniques.

The dispersion may contain a nucleating agent to enhance the transformation to alpha alumina Suitable nucleating agents include fine particles of alpha alumina, alpha ferric oxide or its precursor and any other material which will nucleate the transformation. The amount of nucleating agent is sufficient to effect nucleation. Nucleating such dispersions is disclosed in assignee's U.S. Pat. No. 4,744,802.

Once the gel has formed it may be shaped by any convenient method such as pressing, molding, coating or extrusion and then carefully dried to produce a dried solid material.

The gel can be extruded or simply spread out to any convenient shape and dried, typically at a temperature below the frothing temperature of the gel. Any of several dewatering methods, including solvent extraction, can be used to remove the free water of the gel to form the solid.

After the gel is dried, the dried solid can be crushed or broken by any suitable means, such as a hammer or ball mill or a roll crusher, to form abrasive grain precursor particles hereafter referred to as precursor particles. Any method for comminuting the solid can be used and the term "crushing" is used to include all such methods.

The ceramic abrasive grain of the invention with increased surface area may be prepared by tumbling the non-sintered particles. Non-sintered particles refer to particles that have been dried but not fully sintered, typically having a density which is less than 60% of theoretical density in such a condition. Calcined non-sintered particles are typically about 5% of theoretical density. The preferred method of making the non-sintered particles is disclosed in U.S Pat. No. 4,744,802 assigned to the assignee of the present application. Tumbling of the non-sintered particles may be accomplished either prior to calcining or prior to final firing (sintering). The non-sintered particles are relatively soft and, when they tumble together in a mixer, the edges break off to produce fines which are redeposited upon the surface of the abrasive grains via mechanical impingement as tumbling is continued. In a first embodiment the non-sintered particles are tumbled in a mixer to generate fine particulate material. Tumbling may be accomplished by charging a mixer with a specified amount of non-sintered particles. At this point in the process, the non-sintered particle will be relatively soft. Tumbling results in contact between non-sintered particles which generates fine particles. Continued tumbling causes the fines to redeposit on the surfaces of the non-sintered particles via mechanical impingement. During final firing, the fine particles sinter along with the non-sintered particle to form abrasive grains. The redeposited fine particles form as separated protuberant masses on the surface of the abrasive grain, thereby increasing the surface area of the abrasive grain which results in improved adhesion to the bond system.

In a second embodiment, the non-sintered particles are tumbled in a mixer with added fine particles which are of a different composition from that of the non-sintered particles yet which form inorganic protuberant masses on the surface of the abrasive grains. These fines, along with the fines of the non-sintered particles that are broken from the surface of the non-sintered particles during the tumbling, are redeposited onto the surface of the non-sintered particles during continued tumbling. Final sintering causes the fine particles, both the added and the generated, to sinter along with non-sintered particles to form abrasive grain having surface protuberances.

In order to facilitate the tumbling, non-sintered particles are charged to a mixer in a specified weight ratio. In general, the mixer should be about 10 to 75% full, preferably about 20 to 50% full by volume with non-sintered particles. The non-sintered particles are tumbled for a time sufficient to generate an adequate amount of fine particles without undesirably rounding the edges of the non-sintered particles and thereby on sintering producing an abrasive grain which has undesirably rounded edges which does not abrade as well as an abrasive with sharp edges. Some experimentation may be needed to predict the exact time necessary to tumble the non-sintered particles, since the time is a function of the energy generated. Non-sintered particles which have been prefired or calcined require more tumbling time, since the particles are harder than non-calcined particles. The tumbling times may easily be determined by those skilled in the art. In general, the more energy generated for a given time period, the less tumbling time required. This energy is the mechanical energy generated by the non-sintered particles interacting with one another but is also a function of the mixer design. It is also preferred to use a mixer with baffles or flanges to increase the generated energy and thus reduce the tumbling time. Although any type of mixer may be utilized, a closed system is preferred to avoid fine particle loss. Not all mixer designs will provide the necessary conditions to cause the fine particles to adhere to the non-sintered particles via mechanical impingement. For example, a vibratory mill does not provide the necessary interactions between the particles to cause the fines to break off and deposit themselves on the unsintered particles. The preferred mixer design is a ball mill without the abrasive media. Typical tumbling times are on the order of 5 to 180 minutes, preferably 20 to 50 minutes.

In the first embodiment, the non-sintered particles alone are tumbled to produce fines of the same chemical composition as the non-sintered particles. In the second embodiment, the non-sintered particles are tumbled with added fines of a different composition, resulting in a blend of these with fines of the same chemical composition which are generated as the non-sintered particles are tumbled. The second embodiment has an unexpected benefit in that it permits the tailor-making of abrasive grain surfaces by selecting the appropriate fine particles to be tumbled with the non-sintered particles, it being well known in the art that the surface of the abrasive grain has a significant role during abrading applications.

After crushing (and tumbling if done at this time), the dried gel particles are then calcined to remove essentially all volatiles and transform the various components of the grains into ceramics. The dried gel particles are generally heated (calcined) at a temperature between about 400° C. and about 800° C. and held within this temperature range until the free water and over 90 weight percent of any bound water is removed.

Tumbling can occur either before or after the calcining step so long as it occurs before the final firing step. It is preferred that the tumbling be done before the calcining step for ease of handling.

The calcined particles are then sintered by heating to a temperature of between about 1000° C. and about 1650° C. and holding within this temperature range until substantially all of the alpha alumina precursor material (e.g., alpha alumina monohydrate) is converted to alpha alumina. Of course, the length of time to which the ceramic must be exposed to the sintering temperature to achieve this level of conversion and will depend upon various factors but usually from about 5 to about 30 minutes is sufficient.

Other steps can be included in this process, such as rapidly heating the material from the calcining temperature to the sintering temperature, sizing granular material, centrifuging the dispersion to remove sludge waste, etc. Moreover, this process can be modified by combining two or more of the individually described steps, if desired.

It is conceivable that a ceramic abrasive grain may go through several high temperature firing cycles. The tumbling must be done prior to the last or sintering firing cycle. The tumbling process should not be accomplished after sintering, since it would cause small parts of the abrasive grains to break off with no means to sinter them onto the abrasive grain surface.

Figure 2:
FIG. 2 is a 700x photomicrograph of the surface of commercially available ceramic abrasive grain of the same composition of the grain of FIG. 1 except without surface modification according to the present invention.

FIG. 1 shows the protuberant surface of an abrasive grain according to the invention while FIG. 2 by contrast shows the very smooth surface of a conventional ceramic abrasive grain. It should be noted that the increased surface area of the abrasive grain of the invention does not result because of an increase of porosity of the abrasive grain. The abrasive grain of the invention preferably has a density of at least 90% of theoretical. While porous abrasive grains tend to have a large surface area, their performance is substantially inferior because of decreased strength and integrity.

The surface area ratio is one means by which the abrasive grain of the invention may be characterized. The abrasive grain of the invention has a surface area ratio of at least 1.5, preferably at least 2.0. Surface area ratio, a measure of the increase in surface area of the abrasive grain, is determined by dividing the surface area of the abrasive grain of the invention by the surface area of the standard untreated graded abrasive grains for a given grade. The surface area ratio is a more meaningful way to characterize the increase in surface area since every abrasive grain grade has a different particle size and would thus have a different surface area. The grading standard for abrasive grains may be found in American National Standard Institute (ANSI) Standard No. B74.18, 1984; the coarse and control fractions were used for a given grade to calculate surface area ratios. Untreated graded standard abrasive grains may be purchased from Minnesota Mining and Manufacturing (3M) Company of St. Paul, Minn., under the trade designation Cubitron abrasive grain. The tumbled abrasive grains were made according to the teachings in U.S. Pat. No. 4,744,802, except that the abrasive grains were tumbled for 20 minutes in a ball mill containing no grinding or abrasive media prior to prefiring. The ball mill was approximately 1.82 meter in length with a 1.82 meter inside diameter and was rotated at 16 rpm. Baffles (5.1 cm high and 5.1 cm thick) were spaced around the inside circumference of the ball mill at approximately 46 cm intervals. The remainder of the steps were the same as the teachings of U.S. Pat. No. 4,744,802.

Listed below are the surface areas of the untreated ANSI Standard graded abasive grain and the tumbled abrasive grain made according to the invention and the calculated surface are ratio. The surface area was measured on a Quantosorb, Model QS 13 surface area measuring device which was obtained from Quanthchrme Company, Syusett, N.Y. The samples were soaked in nitrogen gas for 20 minutes prior to testing.

| | Surface Area Measurements | | |
|---|---|---|---|
| Grade | ANSI Grains ($m^2/g$) | Tumbled Grains ($m^2/g$) | Ratio |
| 36 | 0.045 | 0.26 | 5.8 |
| 50 | 0.041 | 0.29 | 7.1 |
| 80 | 0.19 | 0.40 | 2.1 |
| 120 | 0.12 | 0.47 | 3.8 |

The protuberant coating on the surface of the abrasive grain resulting from attachment thereto of the fines is discontinuous, leaving exposed portions of the original surface of abrasive grain with an irregular coating of the fine inorganic particles. This discontinuous coating has greater surface area than a continuous coating, leading to improved adhesion to the bond system.

The materials from which the fine particles are chosen are sinterable to form a ceramic typically based on metal oxide, nitride, carbide, oxynitride, or oxycarbide. Examples of typical addition fines will sinter to the following: alumina, aluminum oxynitride, metal oxides of zinc, magnesium or nickel, alpha alumina, alumina zirconia, zirconia oxide, silicon nitride, rare earth oxides, yttrium oxide, cerium oxide, titanium carbide, titanium nitride, silicon alumina oxynitride, silicon aluminum oxycarbide, yttrium alumina-garnet, and hexagonal rare earth aluminates. The addition fines may be added as a precursor of the final sintered composition. The addition fines are preferably added directly to the mixer in a ratio from 1 part fines to 99 parts precursor particles to 30 parts fines to 70 parts precursor particles. The addition fines can be added to the mixer in a powder form. It has been verified via a scanning electron microscope and Energy Dispersion X-ray Analysis (EDAX) which determines elemental analysis that the addition fines are indeed attached to the surface of the abrasive grain.

Some addition fines may also co-react with the alumina-based abrasive grain during sintering. For example, the oxides of cobalt, nickel, zinc and magnesium will typically form a spinel structure with the alumina. Yttria will typically react with alumina to form $3Y_2O_3 \cdot 5Al_2O_3$, a garnet crystal phase. Praseodymium., samarium, ytterbium, neodymium, lanthanum, gadolinium, cerium, dysprosium, erbium, and mixtures of two or more of these rare earth metals will typically react with alumina to form a garnet, beta alumina, perovskite, or hexagonal rare earth aluminate crystal structure.

The average particle size of the fines should initially be between about 0.05 and 50 micrometers. The average particle size of the non-sintered particle is between 50 micrometers to 1200 micrometers. In general, the large particle size fines do not work as well as the small particle size fines on the small particle size non-sintered particles. For example, an abrasive grain having a particle size of 120 micrometers, typically would have fines on the order of 0.2 to 5 micrometers. Likewise, an abrasive grain having a particle size of 600 micrometers, preferably has fines on the order of 0.2 to 10 micrometers. The preferred addition fine average particle size is between 0.1 and 15 micrometers. If the particle size of the fines is too large, adhesion to the surface of the abrasive grain may be inadequate. If the particle size of the fines is too small, there would be little or no increase in surface area.

The ceramic abrasive grains of the present invention are conveniently handled and incorporated into various abrasive products according to well known techniques to make, for example, coated abrasive products, bonded abrasive products, and lofty non-woven abrasive products. The methods of making such abrasive products are well known to those skilled in the art.

A coated abrasive product includes a backing, for example, formed of paper, fiber, fabric (e.g., woven or non-woven fabric such as paper) which may be saturated with a filled binder material, a polymer film such as that formed of oriented heat set polypropylene or polyethylene terephthalate which may be first primed, if needed, with a priming material, or any other conventional backing material. The coated abrasive also includes a binder material, typically in layers including a make or maker coat, a size or sizing coat and possibly a supersize coat. Conventional binder materials include phenolic resins.

Non-woven abrasive products typically include an open porous lofty polymer filament structure having the ceramic abrasive grains distributed throughout the structure and adherently bonded therein by an adhesive material. The method of making such non-woven abrasive products is well known.

Bonded abrasive products typically consist of a shaped mass of abrasive grains held together by an organic or ceramic binder material. The shaped mass is preferably in the form of a grinding wheel. The preferred binder materials for the ceramic abrasive grains of the invention are organic binders. Ceramic or vitrified binders may be used if they are curable at temperatures and under conditions which will not adversely affect the ceramic abrasive grains of the present invention.

A coupling agent is preferably present in the bond system, particularly when the bond system is part of a coated abrasive that is used in high humidity or wet grinding conditions. Typical examples of coupling agents and their useful quantities in abrasive products may be found in assignee's U S. patent application Ser. No. 132,485, filed Dec. 14, 1987, incorporated herein by reference.

EXAMPLES

The following non-limiting examples will further illustrate the invention.

CONTROL EXAMPLE AND EXAMPLES 1-3

The Control Example and Examples 1-3 compare the effect of tumbling on the performance of abrasive grain.

CONTROL EXAMPLE

The Control Example is abrasive grain made in a conventional way without tumbling with fines.

The Control Example grain was made according to the following procedure. Into a continuous mixer were charged 12,000 ml of deionized water, 282.5 g of 11N analytical reagent grade nitric acid, 4780 g of alpha aluminum oxide monohydrate powder at 78% solids sold under the trade designation Disperal ® and 761 grams of an alpha iron oxide precursor aqueous solution at 10% solids. The charge was dispersed until a homogeneous solution was obtained. The resulting dispersion and an aqueous solution of magnesium nitrate $[Mg(NO_3)_2 \cdot 6H_2O]$ were metered though an in line mixer to form a gel in an amount to provide the following composition after the final firing: 93.5% alpha alumina, 4.5% MgO and 2% $Fe_2O_3$. The resulting gel was then dried in a forced air above at 150° C. to a friable solid.

The resultant dried material was crushed using an impact hammer mill and a roll crusher.

The dried, screened, crushed gel was calcined by being fed into the end of a kiln which was a 23 cm diameter 4.3 meter long stainless steel tube having a 2.9 meter hot zone, the tube being inclined at 2.4 degrees with respect to the horizontal, and rotating a 7 rpm, to provide residence time therein of about 15 minutes. The calciner had a hot zone feed end temperature of 350° C. and exit end temperature of 800° C. The fired product from the calciner was fed into a 1390° C. kiln which was a 10.1 cm diameter 1.53 meter long silicon carbide tube included at 4.4 degrees with respect to the horizontal and having a 76 cm hot zone, rotating at 10 rpm, to provide a residence time therein of about 3.8 minutes. The abrasive grain exited the kiln into room temperature air where it was collected in a metal container and allowed to cool to room temperature. The abrasive grain was a conventional grade 36 and had an average particle size of 700 micrometers.

Abrasive Disc Preparation

After the abrasive grain was made, it was utilized in a coated abrasive disc. The discs were prepared using conventional coated abrasive making procedures, conventional 0.76 mm vulcanized fiber backings and conventional calcium carbonate-filled phenolic make resin and conventional cryolite-filled phenolic size resin. The average make weight was 172 grams/square meter, the average size grain weight was 696 grams/square meter. The make resin was precured for 90 minutes at 88° C. and the size resin was precured for 90 minutes at 88° C. followed by a final cure of 100° C. for 10 hours. The coating was done using conventional techniques in a one-trip operation with curing in a forced air oven. The cured discs were first conventionally flexed to controllably break the hard bonding resins. The test results can be found in Table 1 for the Shelling Test and Table 2 for the Cut Test.

Shelling Test

The Shelling Test is designed to measure the time it takes for the abrasive grain to shell from a coated abrasive disc. The test equipment included 17.8 cm diameter test coated abrasive discs with a 2.22 cm mounting hole attached to a 16.5 cm diameter 1.57 mm thick hard phenolic backup pad which was in turn mounted on a 15.2 cm diameter steel flange. The test disc so supported was rotated counter-clockwise at 3550 rpm. The 1.8 mm peripheral edge of a 25 cm diameter 1010 carbon steel disc-shaped workpiece, deployed 18.5° from a position normal to the abrasive disc and rotated counter-clockwise at 2 rpm, was placed into contact with the abrasive face of the abrasive disc under a load of 2.9 kg. The test endpoint was 20 minutes or when the disc begins to shell, i.e., a substantial portion of its abrasive grain flies off of the disc, whichever occurred first. At the end of the test the workpiece was weighed to determine the amount of metal cut (abraded) from the workpiece. The discs were humidified for one week prior to testing at the humidity level specified in Table I or II below.

Cut Test

For the Cut Test, the 17.8 diameter disc with a 2.22 cm center hole was attached to an aluminum back up pad have a beveled edge and used to grind the face of a 2.5 cm by 18 cm 1018 mild steel workpiece. The disc was driven at 5,500 rpm while the portion of the disc overlaying the beveled edge of the back up pad contacted the workpiece at 5.92 kg pressure generating a disc wear path of about 140 cm². Each disc was used to grind a separate workpiece for one minute each for a total time of 12 minutes each or for sufficient one minute time segments until no more than 5 grams of metal were removed in any one minute grinding cut.

EXAMPLE 1

Example 1 was made and tested in the same manner as the Control Example except the abrasive grain was tumbled prior to calcining. Approximately 1200 kilograms of the dried gel was charged to a ball mill containing no grinding or crushing media. The ball mill was approximately 1.82 meter in width and had a 1.82 meter inside diameter and rotated at 16 rpm. Baffles (5.1 cm high by 5.1 cm thick) were spaced at 46 cm intervals around the inside circumference of the ball mill. The non-sintered particles of dried gel were tumbled for 10 minutes. After tumbling, the remainder of the steps were the same as in the Control Example.

EXAMPLE 2

Example 2 was prepared and tested in the same manner as Example 1, except the tumbling time was 20 minutes.

TABLE I

| Example | (Shelling) | | |
|---|---|---|---|
| | Total Cut (grams) | Time to Shell (minutes) | % Relative Humidity |
| Control | 192 | 3.9 | 30 |
| 1 | 320 | 7.1 | 30 |
| 2 | 424 | 18 | 30 |
| Control | 132 | 2.8 | 45 |
| 1 | 280 | 6.5 | 45 |
| 2 | 287 | 12.4 | 45 |
| Control | 44 | 0.8 | 70 |
| 1 | 98 | 1.4 | 70 |
| 2 | 171 | 4.6 | 70 |

TABLE II

| Example | (Cut) | |
|---|---|---|
| | Total Cut (grams) | % Relative Humidity |
| Control | 1149 | 30 |
| 1 | 1216 | 30 |
| 2 | 1202 | 30 |

From the above listed data, there was dramatic improvement in performance on the Shelling Test, especially at high humidities, indicating improved adhesion between the bond system and the abrasive grains according to Examples 1 and 2 over that of the Control Example. The Cut Test results, where adhesion between the bond system and the abrasive grains is not as critical, showed a slight improvement in performance in Examples 1 and 2 over the Control Example.

EXAMPLES 3 THROUGH 5

Examples 3 through 5 demonstrate the second embodiment of the invention in which added fine particles are tumbled with the precursor particles. The resulting abrasive grain had directly sintered to its surface both the added fine particles and fine particles originating from the precursor particles.

EXAMPLE 3

The abrasive grain and coated abrasive disc for Example 3 was made and tested in the same manner as the Control Example except fines containing oxides of alumina and zirconia were tumbled with the abrasive grain precursor particles prior to calcining. The abrasive fines were made according to Example 1 of U.S. Pat. No. 4,314,827. Approximately 5000 grams of the precursor particles of dried gel and 500 grams of fines containing oxides of alumina and zirconia were charged to a mixer. The fines were in the range 0.25 to 3 micrometers in size. The mixer had a volume of 1.15 cubic meters and was obtained from the Patterson-Keller Co. Inc., East Stroudsburg, as Model # P.K. 232213. The mixer did not have any baffles or flanges in its interior. The fines and the dried, screened, crushed gel precursor particles were tumbled for one hour. The remaining steps to produce the abrasive grain and the coated abrasive were the same as the Control Example. The test results can be found in Table III.

EXAMPLE 4

The abrasive grain and coated abrasive disc for Example 4 was made and tested in the same manner as Example 4 except fine inorganic particles were abrasive fines containing oxides of alumina, yttria and magnesia, not alumina zirconia. The abrasive fines were made according to U.S. Pat. No. 4,770,671 and contained 90% alpha alumina, 8.5% yttrium oxide and 1.5% magnesium oxide. During the final firing, the magnesium in the fines co-reacted with the alpha alumina in the grain to form a spinel. Also at the same time the yttria co-reacted with the alpha alumina to form $3Y_2O_3\text{-}5Al_2O_3$.

EXAMPLE 5

The abrasive grain and coated abrasive disc for Example 5 was made and tested in the same manner as the Control Example except silicon nitride fines were tumbled with the abrasive grain precursor particles prior to calcining. Also Example 5 was subjected to different calcining and firing conditions necessary for the silicon nitride fines. After tumbling, the resulting coated precursor particles were packed into a 5 cm diameter, 30 cm long alumina tube which was placed into a 7.5 cm diameter stationary tube furnace where it was heated to a calcining temperature of 1050° C. in a nitrogen atmosphere after which a 95% nitrogen/5% hydrogen atmosphere was maintained. The temperature was increased over several hours to 1350° C. where it was held for 30 minutes to sinter the abrasive grain and then cooled over several hours to room temperature.

The abrasive grain was used to prepare abrasive discs which were tested as described above. Shelling Test results are shown in Table III.

TABLE III

| | (Shelling) | | |
|---|---|---|---|
| Example | Total Cut (grams) | Time to Shell (minutes) | % Relative Humidity |
| Control | 531 | 16 | 35 |
| 3 | 647 | 20 | 35 |
| 4 | 678 | 20 | 35 |
| 5 | 562 | 20 | 35 |
| Control | 208 | 5.2 | 70 |
| 3 | 396 | 12 | 70 |
| 4 | 378 | 12 | 70 |
| 5 | 355 | 12 | 70 |

It was very evident from the data shown in Table III that autogenously bonded added fines increased the adhesion between the abrasive grain and the bonding resin.

EXAMPLES 6 AND 7

Examples 6 and 7 compare abrasive grain tumbled before and after calcining. The test results can be found in Table IV.

EXAMPLE 6

Example 6 was made and tested in the same manner as Example 1 except that a different ball mill was utilized to tumble the abrasive grain. Approximately 182 grams of the dried gel was charged into a ball mill containing no grinding or crushing media. The ball mill had an inside diameter of approximately 1.82 meter and a width of 0.3 meter. Baffles 5.1 cm high by 5.1 cm thick were spaced at approximately 46 cm intervals around the inside circumference of the ball mill. The ball mill rotated at 16 rpm. The non-sintered particles were tumbled for 20 minutes. After tumbling, the remainder of the steps were as in Example 1. The non-sintered particles of Example 6 were not calcined prior to tumbling.

EXAMPLE 7

Example 7 was prepared and tested in the same manner as Example 6, except the non-sintered particles were calcined prior to tumbling.

TABLE IV

| Example Number | Total Cut (grams) | Time to Shell (minutes) | Calcined Before Tumbling | % Relative Humidity |
|---|---|---|---|---|
| Control | 298 | 10 | N/A | 45 |
| 6 | 415 | 14 | no | 45 |
| 7 | 450 | 13 | yes | 45 |
| Control | 90 | 1.9 | N/A | 70 |
| 6 | 208 | 6.7 | no | 70 |
| 7 | 149 | 3.4 | yes | 70 |

It was concluded from the above data that tumbling either before or after calcining significantly improved the shelling resistance of the coated abrasive product.

While this invention has been described in terms of specific embodiments, it should be understood that it is capable of further modifications. The claims herein are intended to cover those variations which one skilled in the art would recognize as the equivalent of what has been described here.

We claim:

1. Abrasive grains comprising alumina-based ceramic particles having separated protuberant masses of autogenously bonded inorganic material to the surface thereof to provide each abrasive grain with an expanded surface area.

2. Abrasive grain according to claim 1 wherein inorganic material is selected from the group consisting of alpha alumina, alumina:zirconia, zirconia, silicon nitride, rare earth metal oxides, yttria, chromia, ceria, titanium carbide, titanium nitride, silicon alumina oxynitride, silicon aluminum oxycarbide, yttrium aluminum-garnet, magnesia, zinc, nickel, hexagonal rare earth aluminates and mixtures thereof.

3. The abrasive grain according to claim 1 wherein said ceramic includes at least one modifying additive.

4. The abrasive grain according to claim 3 wherein said modifying additive comprises an oxide of one or more metals selected from the group consisting of magnesium, zirconium, hafnium, cobalt, nickel zinc, yttrium, praseodymium, samarium, ytterbium, neodymium, lanthanum, gadolinium, cerium, dysprosium and erbium.

5. Abrasive grains according to claim 1 wherein said ceramic includes a nucleating agent.

6. Abrasive grains according to claim 3 wherein said ceramic includes a nucleating agent.

7. An abrasive product comprising abrasive grains including at least a portion of which is the abrasive grains of claim 4.

8. Abrasive grain according to claim 7 wherein inorganic material is selected from the group consisting of alpha, alumina, alumina:zirconia, zirconia, silicon nitride, rare earth metal oxides, yttria, chromia, ceria, titanium carbide, titanium nitride, silicon alumina oxynitride, silicon alumina oxycarbide, yttrium aluminum-garnet, magnesia, zinc oxide, nickel oxide, hexagonal rare earth aluminates and mixtures thereof.

9. The abrasive product of claim 7 as a bonded abrasive product comprising a shaped mass of said abrasive grains.

10. The abrasive product of claim 8 wherein said shaped mass is in the form of a grinding wheel.

11. The abrasive product of claim 7 as a lofty nonwoven abrasive product comprising an open porous lofty polymer filament structure having said abrasive grains distributed throughout and adhesively bonded within said structure by an adhesive material.

12. The abrasive product of claim 7 including a bond system which includes a coupling agent.

13. The abrasive grains of claim 1 wherein substantially each abrasive grain has a surface area ratio of at least 1.5.

14. The abrasive grains of claim 13 wherein said surface area ratio is at least 2.0.

* * * * *

UNITED STATES PATENT AND TRADEMARK OFFICE
CERTIFICATE OF CORRECTION

PATENT NO. : 5,102,429

DATED : April 7, 1992

INVENTOR(S) : WALD, ET AL.

It is certified that error appears in the above-identified patent and that said Letters Patent is hereby corrected as shown below:

On the cover page, in the "U.S. Patent Documents" section under "References Cited", insert

```
--1,528,543   03/25    Hartmann
  3,269,815   10/63    Koopman              51/308
  4,472,173   08/84    Bruning et al.       51/298
  4,252,544   02/81    Takahashi            51/309
    604,695   05/98    Ringstrom
  3,029,160   04/62    Van Der Beck, Jr.    117/100
  1,954,778   04/34    Nichols
  3,183,071   05/65    C.V. Rue et al.      51/298--
```

On the cover page, in the "Foreign Patent Documents" section under "References Cited", insert

```
--56/88882    07/81    Japan
  3147597     02/83    Fed. Rep. of Germany
```

UNITED STATES PATENT AND TRADEMARK OFFICE
CERTIFICATE OF CORRECTION

PATENT NO. : 5,102,429

DATED : April 7, 1992

INVENTOR(S) : WALD, ET AL.

It is certified that error appears in the above-identified patent and that said Letters Patent is hereby corrected as shown below:

On the cover page, in the "Foreign Patent Documents" section under "References Cited"

"0294208 12/1988 Fed. Rep. of Germany" should read --0294208 12/1988 European Pat. Off.--

| | |
|---|---|
| In the Abstract, line 8: | "parpicles" should read --particles-- |
| Col. 5, lines 38-39 | "components" should read --component.-- |
| Col. 5, line 54 | "alpha alumina" should read --alpha alumina.-- |
| Col. 6, line 15 | "about 5%" should read --about 50%-- |
| Col. 8, line 48 | "surface are" should read --surface area-- |
| Col. 14, line 46 | "silicon aluminum oxycarbide" should read --silicon alumina oxycarbide-- |
| Col. 14, line 47 | "zinc, nickel" should read --zinc oxide, nickel oxide-- |

Signed and Sealed this

Second Day of November, 1993

Attest:

BRUCE LEHMAN

*Attesting Officer*     *Commissioner of Patents and Trademarks*